(12) United States Patent
Xin et al.

(10) Patent No.: US 12,015,475 B2
(45) Date of Patent: Jun. 18, 2024

(54) TECHNIQUES FOR USING DISCRETE SPECTRA

(71) Applicant: ZTE Corporation, Guangdong (CN)

(72) Inventors: Yu Xin, Guangdong (CN); Tong Bao, Guangdong (CN)

(73) Assignee: ZTE Corporation, Guangdong (CN)

( * ) Notice: Subject to any disclaimer, the term of this patent is extended or adjusted under 35 U.S.C. 154(b) by 560 days.

(21) Appl. No.: 17/339,275

(22) Filed: Jun. 4, 2021

(65) Prior Publication Data
US 2021/0328701 A1    Oct. 21, 2021

Related U.S. Application Data

(63) Continuation of application No. PCT/CN2018/119315, filed on Dec. 5, 2018.

(51) Int. Cl.
*H04J 13/16* (2011.01)
*H04L 27/26* (2006.01)

(52) U.S. Cl.
CPC ........ *H04J 13/16* (2013.01); *H04L 27/26025* (2021.01); *H04L 27/2605* (2013.01); *H04L 27/2628* (2013.01)

(58) Field of Classification Search
CPC ...... H04J 13/16; H04J 13/0048; H04J 13/004; H04J 13/18; H04L 27/26025;
(Continued)

(56) References Cited

U.S. PATENT DOCUMENTS

| 5,005,169 A | 4/1991 | Bronder et al. |
|---|---|---|
| 7,164,696 B2 | 1/2007 | Sano et al. |

(Continued)

FOREIGN PATENT DOCUMENTS

| CN | 1611026 A | 4/2005 |
|---|---|---|
| CN | 102136899 A | 7/2011 |

(Continued)

OTHER PUBLICATIONS

International Search Report and Written Opinion mailed on Sep. 18, 2019 for International Application No. PCT/CN2018/119315, filed on Dec. 5, 2018 (6 pages).

(Continued)

*Primary Examiner* — Rina C Pancholi
(74) *Attorney, Agent, or Firm* — Perkins Coie LLP (57) ABSTRACT

Methods, apparatus, and systems for efficiently utilizing scattered narrow spectra without introducing interference among adjacent frequency bands are described. In one example aspect, a wireless communication method includes determining a set of time-domain symbols by applying an inverse Fourier transform to a set of processed data modulated on multiple subcarrier groups. Each subcarrier group comprises an even number of subcarriers and adjacent subcarrier groups are separated by one or more unused subcarriers. The set of processed data is determined by applying a first spreading code to data carried in subcarrier groups having 2×m subcarriers when m is a positive odd number and applying one or more spreading codes to data carried in subcarrier groups having 2×n subcarriers when n is a positive even number. The method also includes transmitting the set of time-domain symbols.

16 Claims, 10 Drawing Sheets

(58) Field of Classification Search
CPC ............. H04L 27/2605; H04L 27/2628; H04L 5/0023; H04L 27/2614; H04L 5/0007; H04L 27/2602; H04L 5/0016; H04L 5/026; H04L 27/2601; H04W 16/14; Y02D 30/70

See application file for complete search history.

(56) References Cited

U.S. PATENT DOCUMENTS

| | | | |
|---|---|---|---|
| 7,672,384 | B2 | 3/2010 | Giannakis et al. |
| 2002/0181421 | A1 | 12/2002 | Sano et al. |
| 2003/0016731 | A1 | 1/2003 | Uesugi |
| 2004/0066740 | A1* | 4/2004 | Suh ................... H04L 27/2605 370/208 |
| 2004/0082335 | A1 | 4/2004 | Hirayama et al. |
| 2004/0114504 | A1* | 6/2004 | Jung ................... H04L 27/2605 370/203 |
| 2005/0181421 | A1 | 8/2005 | Trulson et al. |
| 2005/0232138 | A1 | 10/2005 | Byun et al. |
| 2007/0171994 | A1* | 7/2007 | Parker ................ H04L 27/2615 375/260 |
| 2007/0202816 | A1* | 8/2007 | Zheng ................. H04L 5/0037 455/91 |
| 2008/0298335 | A1* | 12/2008 | Lee ..................... H04L 5/026 375/E1.001 |
| 2009/0016412 | A1* | 1/2009 | Okamoto ............. H04J 13/10 375/147 |
| 2019/0036750 | A1 | 1/2019 | Xin et al. |
| 2021/0143948 | A1* | 5/2021 | Choi ................... H04W 72/04 |

FOREIGN PATENT DOCUMENTS

| | | |
|---|---|---|
| CN | 102638437 A | 8/2012 |
| CN | 106789824 A | 5/2017 |
| CN | 108111447 A | 6/2018 |
| EP | 2654237 A1 | 10/2013 |
| JP | 2003-348047 A | 12/2003 |
| JP | 2006-080798 A | 3/2006 |
| JP | 2018-121107 A | 8/2018 |
| WO | 2006009411 A1 | 1/2006 |
| WO | 2018/049544 A1 | 3/2018 |

OTHER PUBLICATIONS

Co-Pending JP Application No. 2021-531986, JP Office Action dated Sep. 2, 2022, 11 pages with unofficial summary translation.
USPTO, Notice of Allowance for U.S. Appl. No. 17/339,211, filed Jun. 4, 2021, mailed on Jun. 13, 2023, 9 pages.
Co-Pending JP Application No. 2021-531986, JP Final Office Action dated Mar. 2, 2023 4 pages with machine translation.
Co-Pending KR Application No. 10-2021-7020990, KR Office Action dated May 17, 2023, 6 pages with unofficial summary translation.
Extended European Search Report for EP Patent Application No. 18930266.4, mailed Nov. 12, 2021 (12 pages).
Zhang, Jingtao et al: "FG-MC-CDMA System Performance in Multi-band Channels", Communication Networks and Services Research Conference, 2008. CNSR 2008. 6th Annual, IEEE, Piscataway, NJ, USA, May 5, 2008 (May 5, 2008), pp. 132-138, XP031252432, ISBN: 978-0-7695-3135-9, 7 pages.
Poston, J D et al: "Discontiguous OFDM considerations for dynamic spectrum access in idle TV channels", 2005 1st IEEE International Symposium on New Frontiers in Dynamic Spectrum Access Networks, IEEE, Baltimore, MD, USA, Nov. 8, 2005 (Nov. 8, 2005), pp. 607-610, XP010855159, DOI: 10.1109/DYSPAN.2005. 1542679 ISBN: 978-1-4244-0013-3, 4 pages.
KIPO, Notice of Allowance for Korean Application No. 10-2021-7020990, mailed on Nov. 29, 2023, 8 pages with unofficial English translation.

* cited by examiner

TECHNIQUES FOR USING DISCRETE SPECTRA

CROSS-REFERENCE TO RELATED APPLICATIONS

This application is a continuation of and claims priority to International Patent Application No. PCT/CN2018/119315, filed on Dec. 5, 2018, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for efficiently utilizing scattered narrow spectra without introducing interference among adjacent frequency bands, thereby increasing resource utilization for wireless communication systems.

In one example aspect, a wireless communication method is disclosed. The method includes determining a set of time-domain symbols by applying an inverse Fourier transform to a set of processed data modulated on multiple subcarrier groups. Each subcarrier group comprises an even number of subcarriers and adjacent subcarrier groups are separated by one or more unused subcarriers. The set of processed data is determined by applying a first spreading code to data carried in subcarrier groups having 2×m subcarriers when m is a positive odd number and applying one or more spreading codes to data carried in subcarrier groups having 2×n subcarriers when n is a positive even number. The method also includes transmitting the set of time-domain symbols.

In another example aspect, a wireless communication method is disclosed. The method includes receiving a set of time-domain symbols carrying a set of processed data modulated on one or more subcarrier groups. Each subcarrier group comprises an even number of subcarriers. The set of processed data corresponds to an output of applying a first spreading code to data carried in subcarrier groups having 2×m subcarriers when m is a positive odd number and applying one or more spreading codes to data carried in subcarrier groups having 2×n subcarriers when n is a positive even number. The method also includes demodulating the set of time-domain symbols to obtain the data.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Section headings are used in the present document only to improve readability and do not limit scope of the disclosed embodiments and techniques in each section to only that section. Certain features are described using the example of 5G wireless protocol. However, applicability of the disclosed techniques is not limited to only 5G wireless systems.

Figure 1:
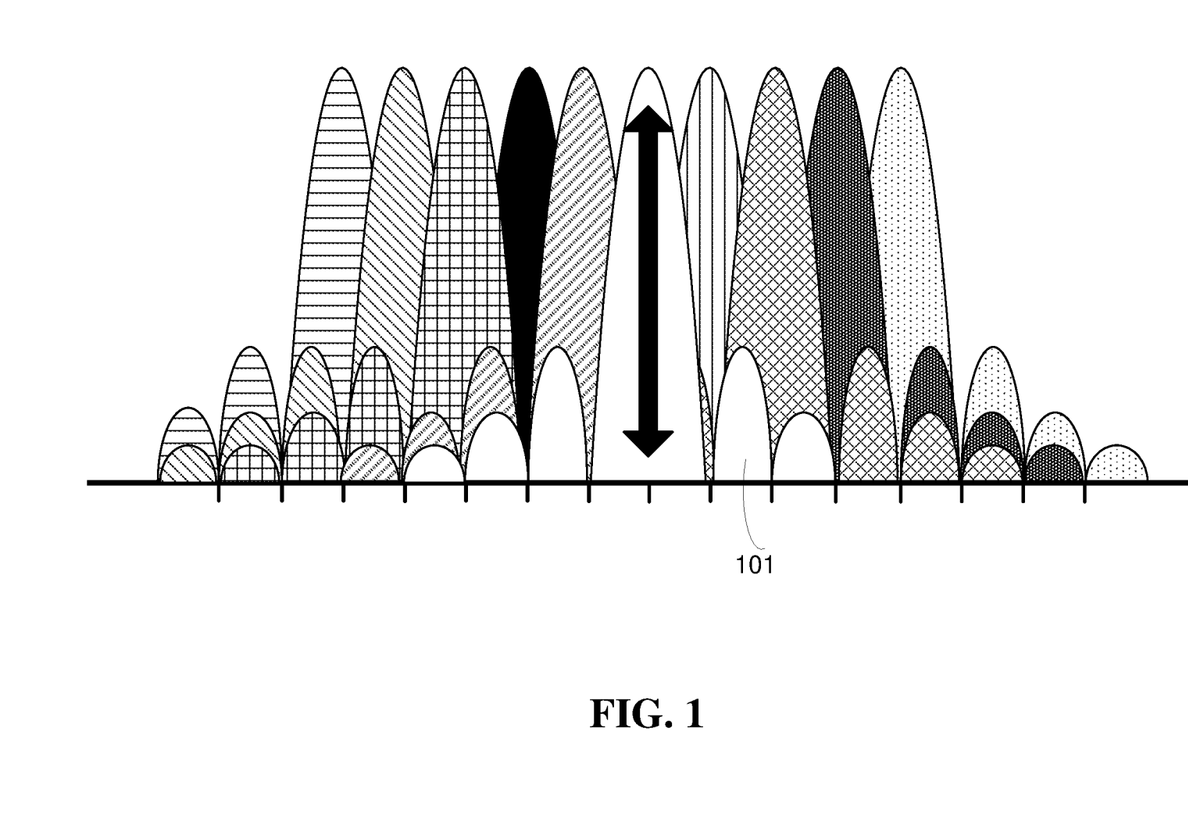
FIG. 1 shows a schematic diagram of side lobes producing overlapping spectra between subcarriers in the frequency domain.

In telecommunication, Long-Term Evolution (LTE) is the fourth generation (4G) standard for high-speed wireless communication. The LTE system adopts Orthogonal Frequency Division Multiplexing (OFDM) technology, which has been widely used in wireless communication. For example, the Cyclic Prefix (CP) OFDM (CP-OFDM) system can solve the multipath delay problem and divide the frequency selective channel into a set of parallel flat channels, thereby simplifying channel estimation and providing a higher channel estimation accuracy. However, the performance of the CP-OFDM system is sensitive to frequency offset and time offset between adjacent sub-bands due to the fact that the OFDM technology introduces relative high levels of out-of-band (OOB) emission due to the sidelobes of the subcarriers. The OOB emission may result in strong interference into neighboring frequency bands. FIG. 1 shows a schematic diagram of side lobes 101 producing overlapping spectra between subcarriers in the frequency domain. To reduce the impact of OOB emission, the edge of the transmission band can dedicate a certain frequency as a guard interval to reduce the influence of out-of-band leakage on adjacent bands. The guard interval, however, introduces waste in the frequency bands and reduces spectrum efficiency.

The Third Generation Partnership Project (3GPP) standard of the Fifth Generation (5G) New Radio (NR) still provides CP-OFDM-based waveforms for communications. When the sub-carrier spacings between adjacent sub-bands are not the same, there can be interference between adjacent sub-bands. Although spectrum leakage and interference between sub-bands can be slightly reduced by techniques such as a soft CP or a filtering method, the guard intervals that reduce spectral efficiency are still required between sub-bands of different sub-carrier spacings.

Currently, there are many scattered idle spectra with very narrow bandwidth in the wireless spectrum resources. These spectra are generally used as guard bands to protect frequency bands from interfering with each other. Transmissions using these scattered idle spectra can increase resource utilization, yet currently there is no practical way of achieving so without interfering with the existing communication systems in adjacent frequency bands. For example, applying a filter to each of the scattered idle spectra for interference suppression can suppress interference between sub-bands, but it imposes a huge amount of complexity in communication system designs. The filter can also cause inter-symbol interference because each of the scattered idle spectrum is very narrow.

This patent document discloses techniques that can be implemented in various embodiments to increase spectrum utilization by using the scattered idle spectra without causing sub-band interference with the existing communication systems. The disclosed techniques also allow multiple discrete spectra to be processed using the same processing procedure, thereby reducing the design complexity of communication systems.

Figure 2:
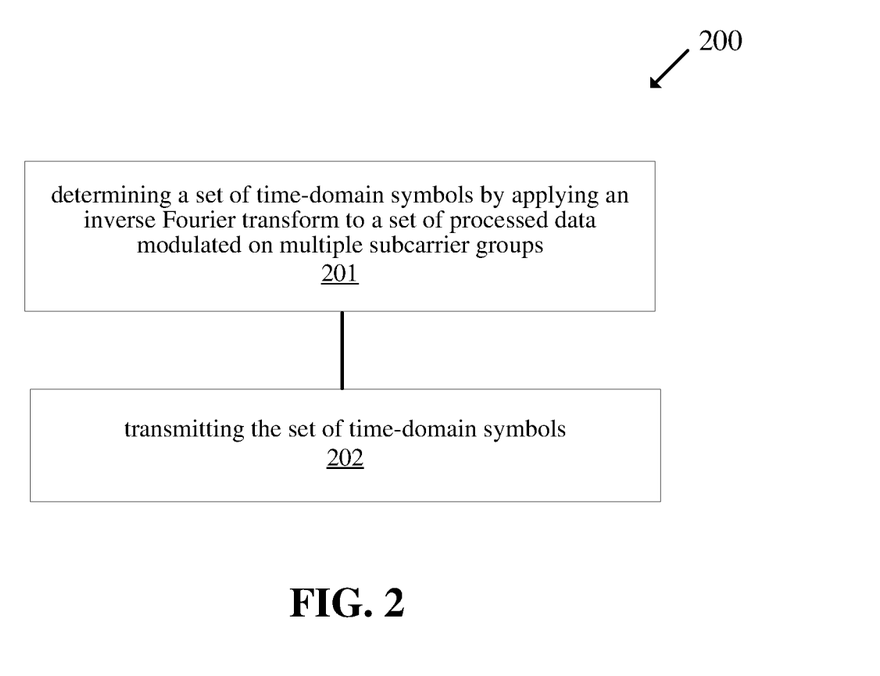
FIG. 2 is a flowchart representation of a wireless communication method in accordance with one or more embodiments of the present technology.

FIG. 2 is a flowchart representation of a wireless communication method 200 in accordance with one or more embodiments of the present technology. The method 200 includes, at step 201, determining a set of time-domain symbols by applying an inverse Fourier transform to a set of processed data modulated on multiple subcarrier groups. Each subcarrier group comprises an even number of subcarriers and adjacent subcarrier groups are separated by one or more unused subcarriers. The set of processed data is determined by applying a first spreading code to data carried in subcarrier groups having 2×m subcarriers when m is a positive odd number and applying one or more spreading codes to data carried in subcarrier groups having 2×n subcarriers when n is a positive even number. The method 200 also includes, at step 202, transmitting the set of time-domain symbols.

For example, data is modulated on M subcarrier groups in the discrete spectra, where M≥2. Each subcarrier group includes 2×n subcarriers. The subcarrier groups are separated by K(m)≥1 unused subcarriers (e.g., subcarriers carrying zeros). The unused subcarriers correspond to the spectra of existing communication systems that are used for data transmissions. In some cases, a subcarrier group may include an odd number of subcarriers. A padding subcarrier from the adjacent unused subcarriers can be added to the group to ensure that each group has an even number of subcarriers. Alternatively, a subcarrier from the subcarrier group can be added to the adjacent unused subcarriers to ensure that each group has an even number of subcarriers.

In some embodiments, individual subcarrier groups include different numbers of subcarriers—that is, the value of n changes for each subcarrier group. For example, one subcarrier group includes two subcarriers, while another subcarrier group includes four subcarriers. In some embodiments, n is a fixed value, and each subcarrier group includes the same number of subcarriers. Because the scattered spectra can be narrow, in some embodiments, K(m)≥2×n, which indicates that the unused subcarriers (e.g., subcarriers carrying zeros) are wider than the scattered spectra.

In some embodiments, when n is an odd number, the data modulated onto the 2×n subcarriers is spread using a spreading code [1, −1]. When n is an even number, the data modulated onto the 2×n subcarriers can be spread using at least one of the following spreading codes: [1, −1], [1, −1, −1, 1], [1, −1, 1, −1], or [1, 1, −1, −1]. For example, the data can be spread using [1, −1]. The data can also be spread using [1, −1, −1, 1]. In some embodiments, multiple layers of data in a multicarrier system can be spread using multiple spread codes, e.g., [1, −1, −1, 1] and [1, −1, 1, −1]. In some embodiments, data in different subcarrier groups are spread using different codes, e.g., [1, −1, −1, 1] and [1, −1, 1, −1]. Similarly, in some implementations, multiple layers of data in a multicarrier system can be spread using [1, −1, −1, 1], [1, −1, 1, −1], and [1, 1, −1, −1]. Data carried in different subcarrier groups can be spread using different codes, e.g., [1, −1, −1, 1], [1, −1, 1, −1], and [1, 1, −1, −1].

In some embodiments, due to the low peak-to-average ratio of uplink traffic, the uplink data modulated onto the 2×n subcarriers is spread using the code [1, −1]. The downlink data modulated onto the 2×n subcarriers can be spread using one or more of the following codes: [1, −1, −1, 1], [1, −1, 1, −1], or [1, 1, −1, −1]. For example, when there is only one layer of data, the data is spread using the code [1, −1, −1, 1]. When transmitting two layers of data, two spreading codes [1, −1, −1, 1] and [1, −1, 1, −1] can be used for spreading the data. The spread data occupy the same subcarrier resources by code division multiplexing. Similarly, when transmitting three layers of data, three spreading codes [1, −1, −1, 1], [1, −1, 1, −1], and [1, 1, −1, −1] are used for spreading the data. The spread data occupy the same subcarrier resources by code division multiplexing.

Figure 3:
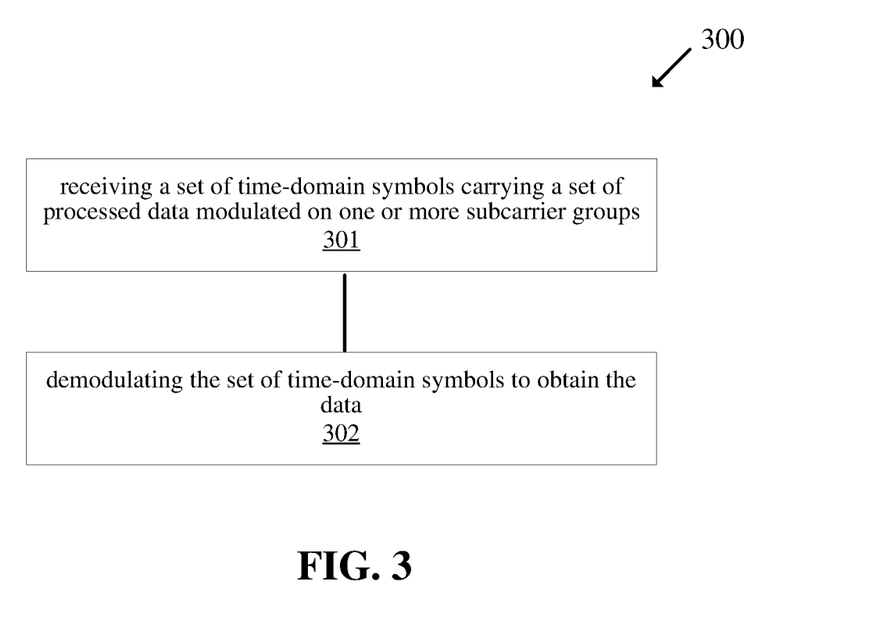
FIG. 3 is a flowchart representation of another wireless communication method in accordance with one or more embodiments of the present technology.

FIG. 3 is a flowchart representation of a wireless communication method 300 in accordance with one or more embodiments of the present technology. The method 300 includes, at step 301, receiving a set of time-domain symbols carrying a set of processed data modulated on one or more subcarrier groups. Each subcarrier group comprises an even number of subcarriers. The set of processed data corresponds to an output of applying a first spreading code to data carried in subcarrier groups having 2×m subcarriers, where m is a positive odd number, and applying one or more spreading codes to data carried in subcarrier groups having 2×n subcarriers, where n is a positive even number. The method 300 also includes, at step 302, demodulating the set of time-domain symbols to obtain the data.

Using the method described above, discrete spectra in the form of discrete subcarrier groups can be processed by a single set of base-band processing procedure, thereby reducing the complexity of communication system designs. Because the subcarrier groups are separated by unused subcarriers (e.g., subcarriers carrying zeros), the data transmitted over the discrete scattered spectra can overlap in time-domain with data in the existing communication systems.

Some examples of the disclosed techniques are described in the following example embodiments.

Embodiment 1

Figure 4:
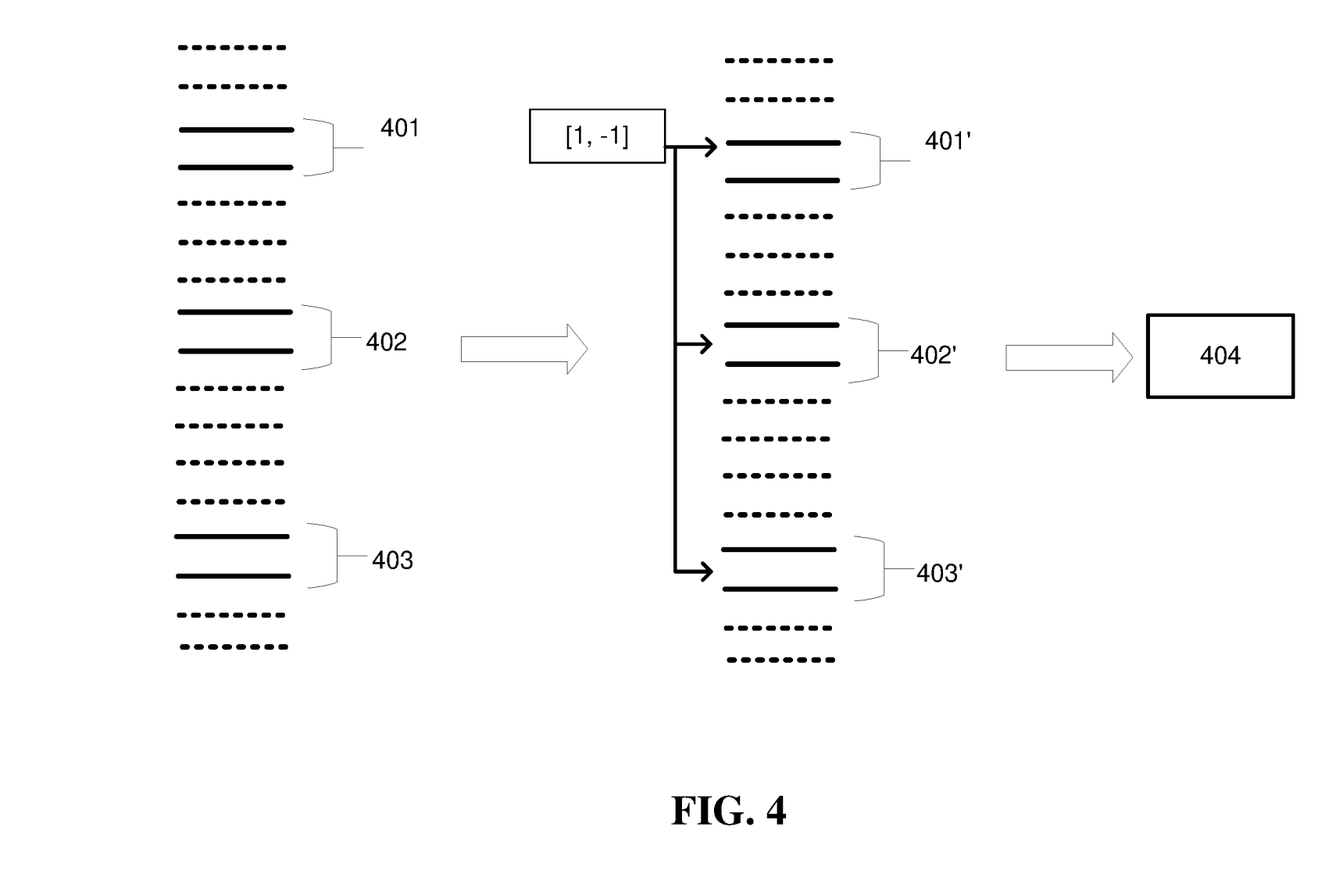
FIG. 4 shows an example of spreading one layer of data in accordance with one or more embodiments of the present technology.

FIG. 4 shows an example of spreading one layer of data in accordance with one or more embodiments of the present technology. The data is modulated onto three subcarrier groups in the frequency domain. Here, each subcarrier group includes the same number 2×n subcarriers: n=1. The subcarrier groups are separated by one or more unused subcarriers (that is, subcarriers that carry no data). For example, the first subcarrier group 401 and the second subcarrier group 402 are separated by three unused subcarriers (e.g., three subcarriers that carry zero). The second subcarrier group 402 and the third subcarrier group 403 are separated by four unused subcarriers (e.g., four subcarriers that carry zero).

In some embodiments, both sides of the frequency domain data also include unused subcarriers. For example, as shown in FIG. 4, two unused subcarriers are on one side of the first subcarrier group 401, and two unused subcarriers are on the other side of the third subcarrier group 403.

Because n is an odd number, when transmitting one layer of data, the data carried by the two subcarriers included in each subcarrier group can be spread by the spread code [1, −1]. For example, when the data carried in the subcarrier group is D, then the data modulated onto the two subcarriers in the subcarrier group is D and −D. The frequency domain data of each symbol is processed by the inverse Fourier transform 404 to obtain time domain data.

Embodiment 2

Figure 5A:
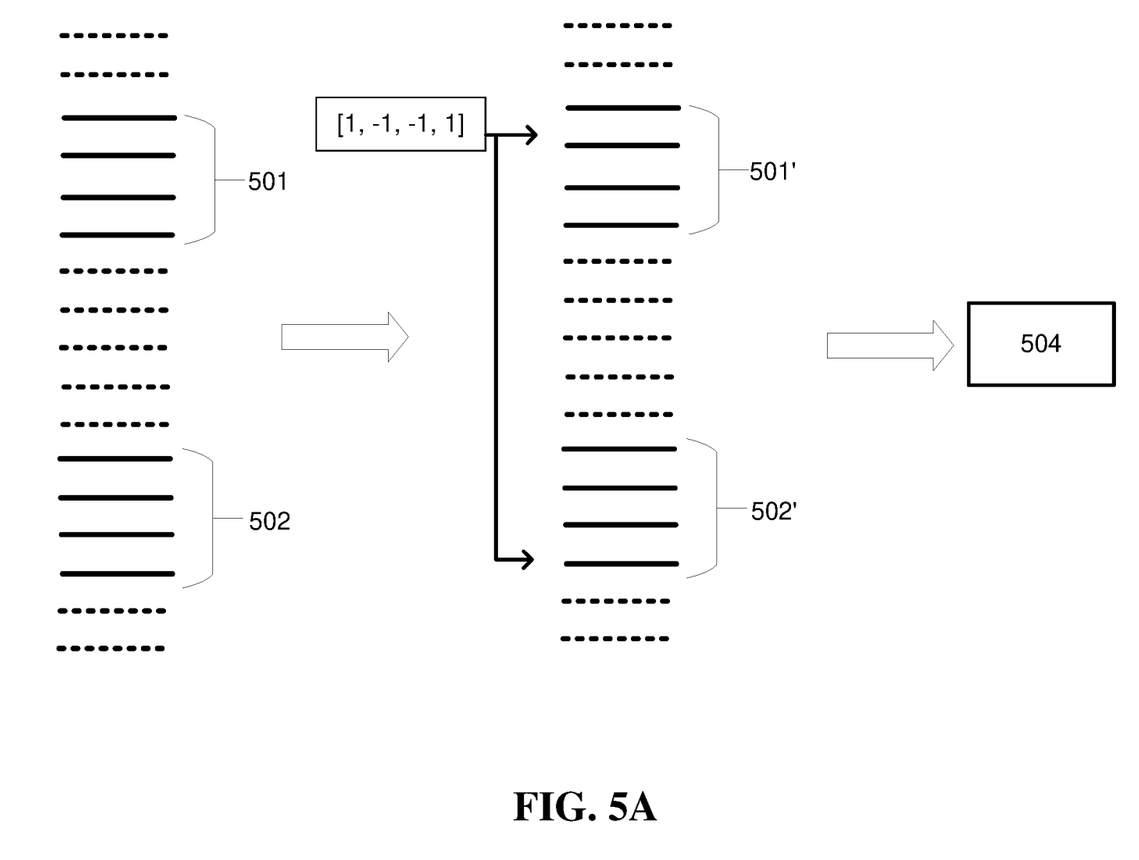
FIG. 5A shows another example of spreading one layer of data in accordance with one or more embodiments of the present technology.

FIG. 5A shows another example of spreading one layer of data in accordance with one or more embodiments of the present technology. The data is modulated onto two subcarrier groups in the frequency domain. Here, each subcarrier group includes the same number 2×n subcarriers: n=2. The subcarrier groups are separated by one or more unused subcarriers (that is, subcarriers that carry no data). For example, the first subcarrier group 501 and the second subcarrier group 502 are separated by five unused subcarriers (e.g., five subcarriers that carry zero).

In some embodiments, both sides of the frequency domain data also include unused subcarriers. For example, as shown in FIG. 5A, two unused subcarriers are on one side of the first subcarrier group 501, and two unused subcarriers are on the other side of the third subcarrier group 502.

Because n is an even number, when transmitting one layer of data, the data carried by the four subcarriers included in each subcarrier group can be spread by one or more spread codes, e.g., [1, −1, −1, 1]. For example, when the data carried in the subcarrier group is D, then the data modulated onto the four subcarriers in the subcarrier group is D, −D, −D, and D. The frequency domain data of each symbol is processed by the inverse Fourier transform 504 to obtain time domain data.

Embodiment 3

Figure 5B:
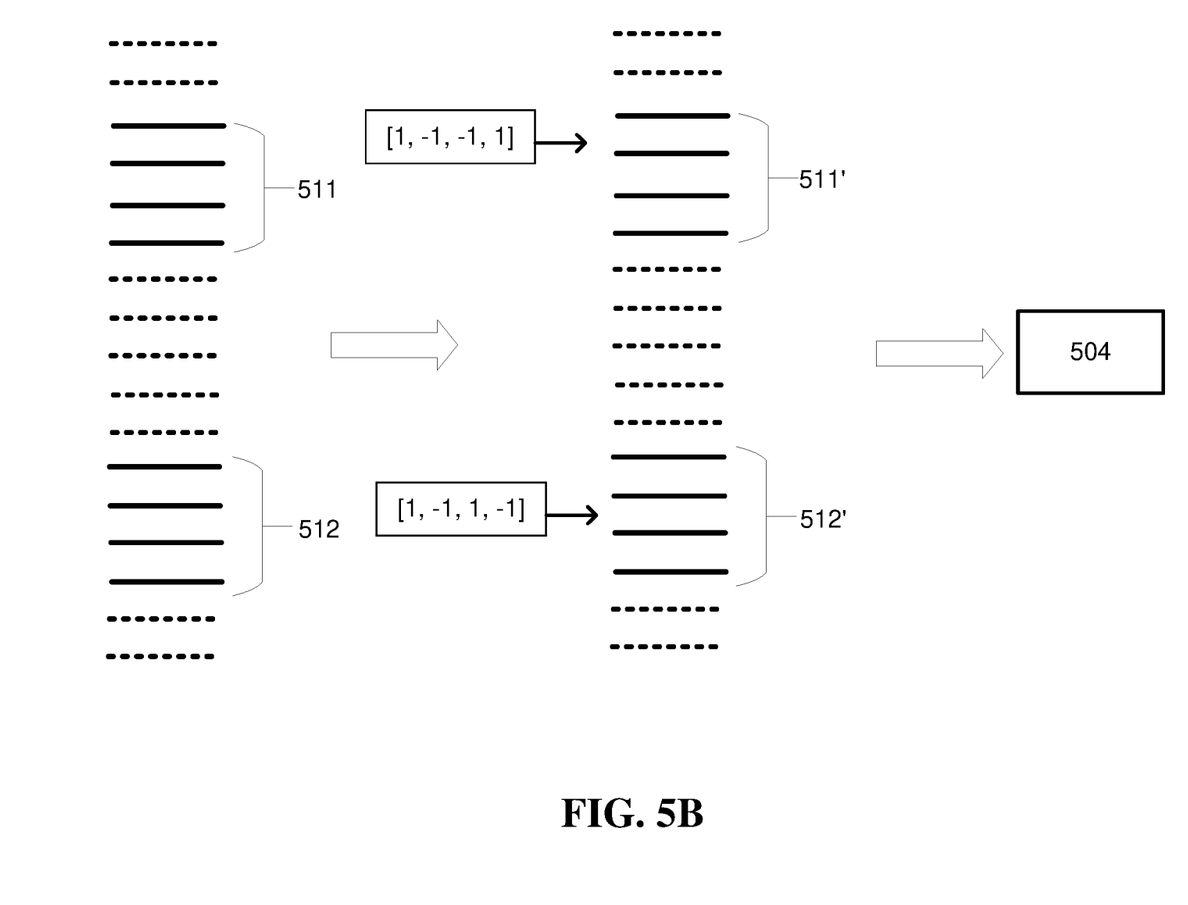
FIG. 5B shows another example of spreading one layer of data in accordance with one or more embodiments of the present technology.

FIG. 5B shows another example of spreading one layer of data in accordance with one or more embodiments of the present technology. The data is modulated onto two subcarrier groups in the frequency domain. Here, each subcarrier group includes the same number 2×n subcarriers: n=2. The subcarrier groups are separated by one or more unused subcarriers (that is, subcarriers that carry no data). For example, the first subcarrier group 511 and the second subcarrier group 512 are separated by five unused subcarriers (e.g., five subcarriers that carry zero).

In some embodiments, both sides of the frequency domain data also include unused subcarriers. For example, as shown in FIG. 5B, two unused subcarriers are on one side of the first subcarrier group 511, and two unused subcarriers are on the other side of the third subcarrier group 512.

In this embodiment, the data modulated onto different subcarrier groups can be spread using different codes. For example, because n is an even number, the data carried by the four subcarriers included in each subcarrier group can be spread by one or more spread codes, e.g., [1, −1, −1, 1] and [1, −1, 1, −1]. For example, if the data carried in the subcarrier group 511 is D1, then the data modulated onto the four subcarriers in the subcarrier group 511' becomes D1, −D1, −D1, and D1. If the data carried in the subcarrier group 512 is D2, then the data modulated onto the four subcarriers in the subcarrier group 512' becomes D2, −D2, D2, −D2. The frequency domain data of each symbol is processed by the inverse Fourier transform 504 to obtain time domain data.

Embodiment 4

Figure 5C:
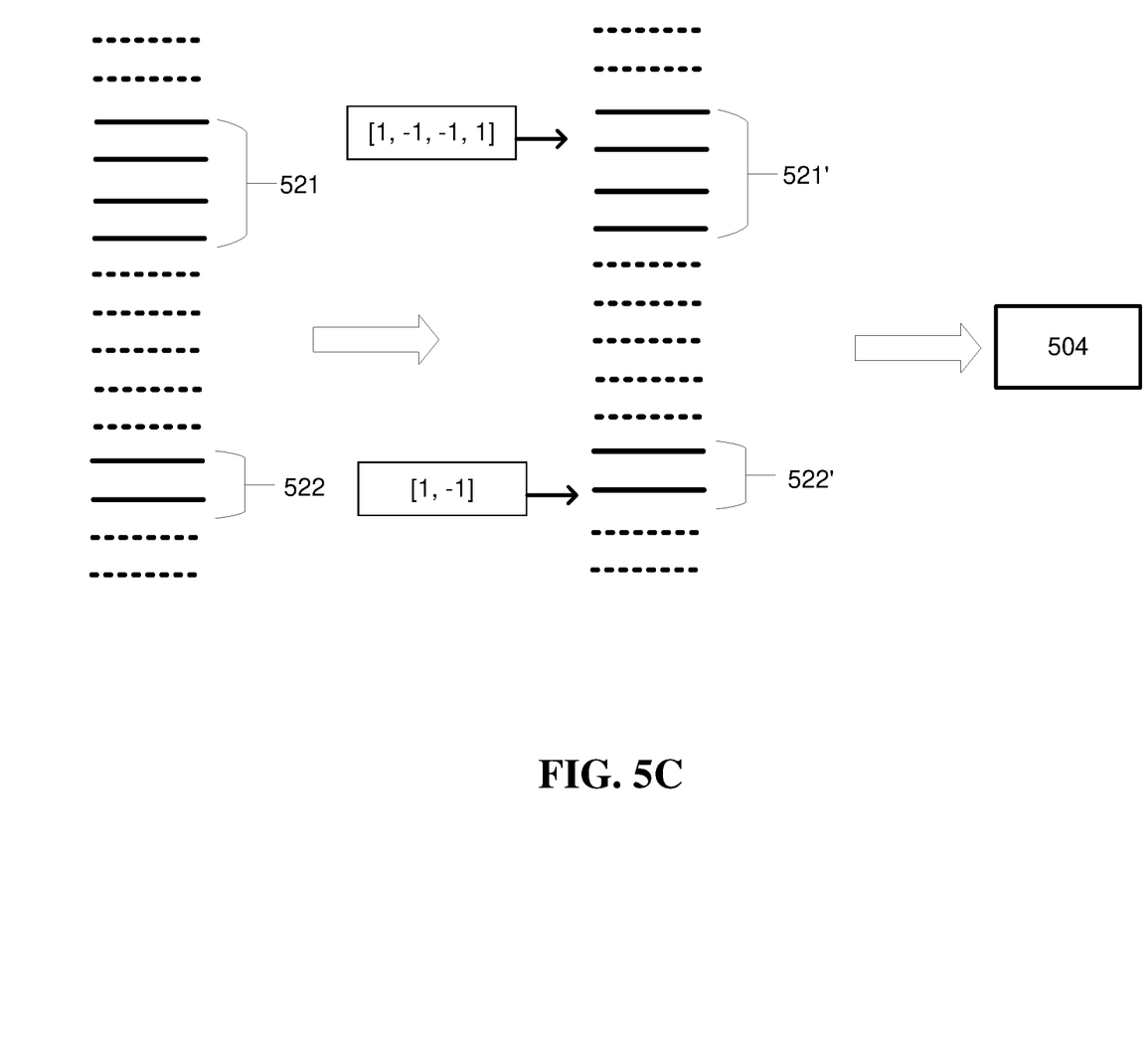
FIG. 5C shows yet another example of spreading one layer of data in accordance with one or more embodiments of the present technology.

FIG. 5C shows yet another example of spreading one layer of data in accordance with one or more embodiments of the present technology. The data is modulated onto two subcarrier groups in the frequency domain. Here, subcarrier groups include different numbers of subcarriers. The first subcarrier group 521 includes four subcarriers (n=2, an even number), and the second subcarrier group 522 includes two subcarriers (n=1, an odd number). The subcarrier groups are separated by one or more unused subcarriers (that is, subcarriers that carry no data). For example, the first subcarrier group 521 and the second subcarrier group 522 are separated by five unused subcarriers (e.g., five subcarriers that carry zero).

In some embodiments, both sides of the frequency domain data also include unused subcarriers. For example, as shown in FIG. 5C, two unused subcarriers are on one side of the first subcarrier group 521, and two unused subcarriers are on the other side of the third subcarrier group 522.

In this embodiment, the data modulated onto different subcarrier groups can be spread using different codes. For example, because n is an even number for the first subcarrier group 521, the data carried by this group can be spread by one or more spread codes, e.g., [1, −1, −1, 1]. For example, if the data carried in the subcarrier group 521 is D1, then the data modulated onto the four subcarriers in the subcarrier group 521' becomes D1, −D1, −D1, and D1. For the second subcarrier group 522, n is an odd number. Thus, the data carried in this group can be spread by the spread code [1, −1]. For example, if the data carried in the subcarrier group 522 is D2, then the data modulated onto the two subcarriers in the subcarrier group 522' becomes D2, −D2. The frequency domain data of each symbol is processed by the inverse Fourier transform 504 to obtain time domain data.

Embodiment 5

Figure 6:
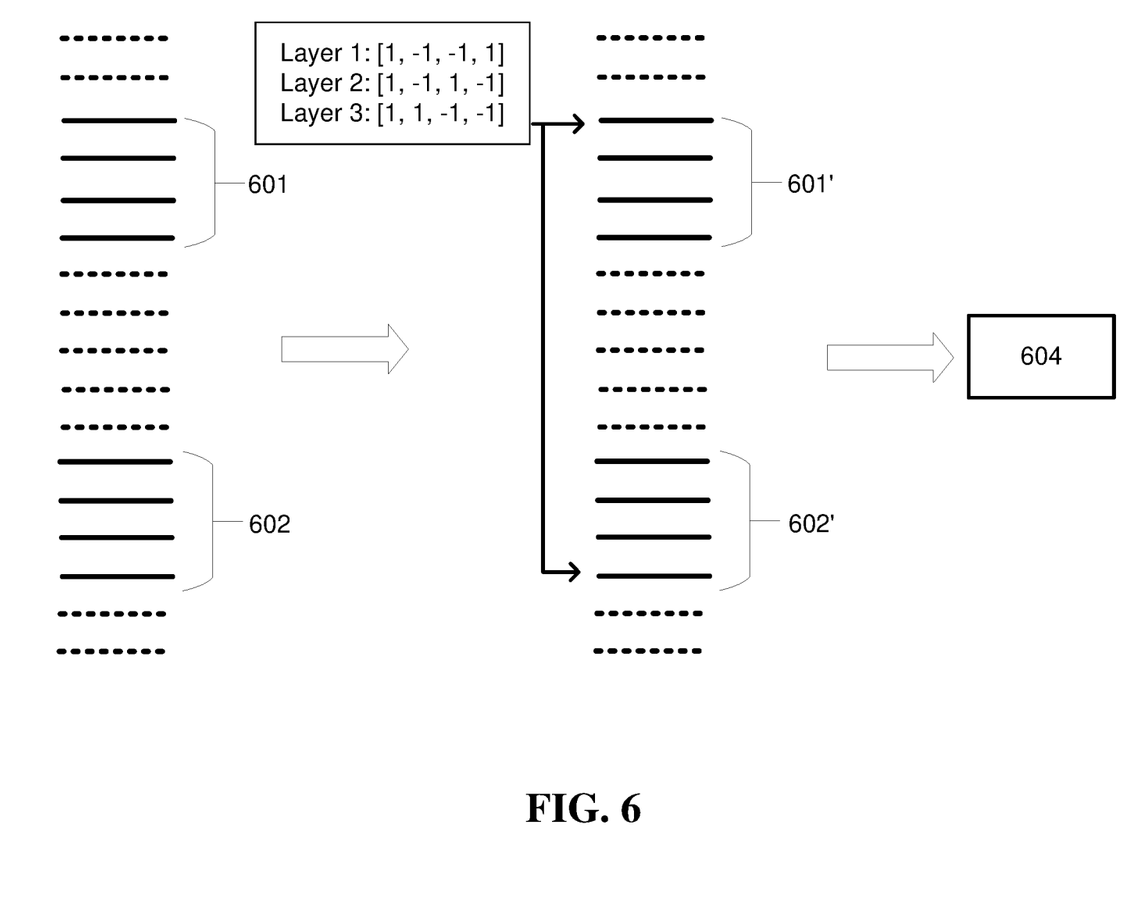
FIG. 6 shows an example of spreading multiple layers of data in accordance with one or more embodiments of the present technology.

FIG. 6 shows an example of spreading multiple layers of data in accordance with one or more embodiments of the present technology. The data is modulated onto two subcarrier groups in the frequency domain. Here, each subcarrier group includes the same number 2×n subcarriers: n=2. The subcarrier groups are separated by one or more unused subcarriers (that is, subcarriers that carry no data). For example, the first subcarrier group 601 and the second subcarrier group 602 are separated by five unused subcarriers (e.g., five subcarriers that carry zero).

In some embodiments, both sides of the frequency domain data also include unused subcarriers. For example, as shown in FIG. 6, two unused subcarriers are on one side of the first subcarrier group 601, and two unused subcarriers are on the other side of the third subcarrier group 602.

Because n is an even number, when transmitting multiple layer of data, the data carried by the four subcarriers included in each subcarrier group can be spread by one or more spread codes, e.g., [1, −1, −1, 1], [1, −1, 1, −1], and [1, 1, −1, −1]. For example, the first layer of data is spread using code [1, −1, −1, 1], the second layer of data is spread using code [1, −1, 1, −1], and the third layer of data is spread using code [1, 1, −1, −1], thereby achieving orthogonality via code division multiplexing. For example, when the data carried in the subcarrier group is D1 for the first layer, D2 for the second layer, and D3 for the third layer, the data modulated onto the four subcarriers in the subcarrier group is [D1, −D1, −D1, D1], [D2, −D2, D2, −D2], and [D3, D3, −D3, −D3]. The data transmitted on the four subcarriers after multiplexing the three layers of data is [(D1+D2+D3), (−D1−D2+D3), (−D1+D2−D3), (D1−D2−D3)]. The frequency domain data of each symbol is processed by the inverse Fourier transform 604 to obtain time domain data.

Embodiment 6

Figure 7:
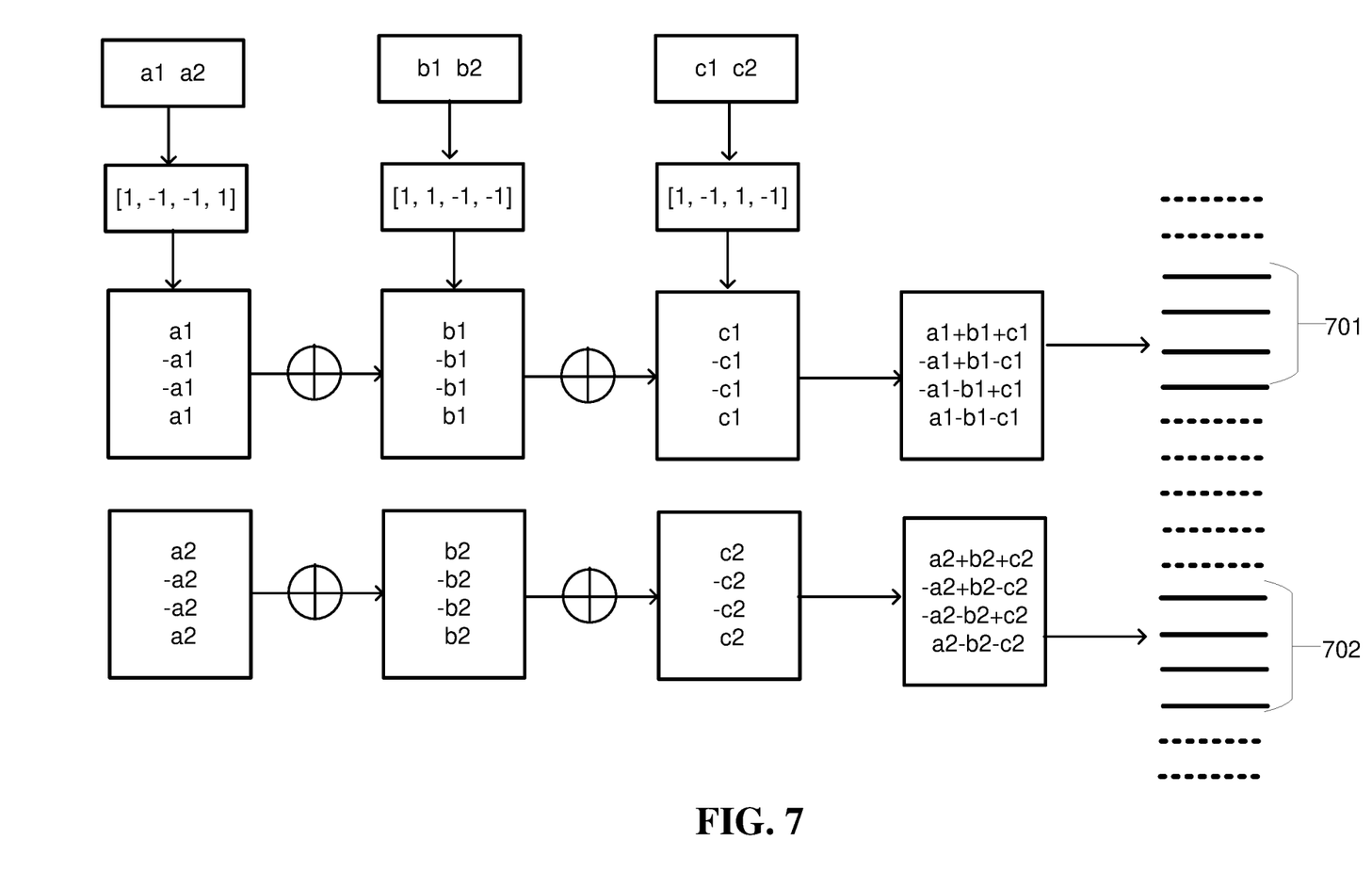
FIG. 7 shows an example of spreading multiple layers of data in accordance with one or more embodiments of the present technology.

FIG. 7 shows an example of spreading multiple layers of data in accordance with one or more embodiments of the present technology. In this embodiment, the data to be transmitted is downlink data including three layers/groups in a multicarrier system. The data is modulated onto two subcarrier groups in the frequency domain. Here, each subcarrier group includes the same number 2×n subcarriers: n=2. The subcarrier groups are separated by one or more unused subcarriers (that is, subcarriers that carry no data).

The data to be transmitted in the first layer is [a1, a2], the data to be transmitted in the second layer is [b1, b2], and the data to be transmitted in the third layer is [c1, c2]. The first layer of data is spread using the code [1, −1, −1, 1] to obtain spread data [a1, −a1, −a1, a1; a2, −a2, −a2, a2]. The second layer of data is spread using the code [1, −1, 1, −1] to obtain spread data [b1, −b1, b1, −b1; b2, −b2, b2, −b2]. The third layer of data is spread using the code [1, 1, −1, −1] to obtain spread data [c1, c1, −c1, −c1; c2, c2, −c2, −c2].

A code division multiplexing is then performed on the spread data of three layers to determine the data to be modulated onto the subcarriers in the two subcarrier groups 701, 702. The frequency domain data of each symbol is processed by the inverse Fourier transform to obtain time domain data.

Figure 8:
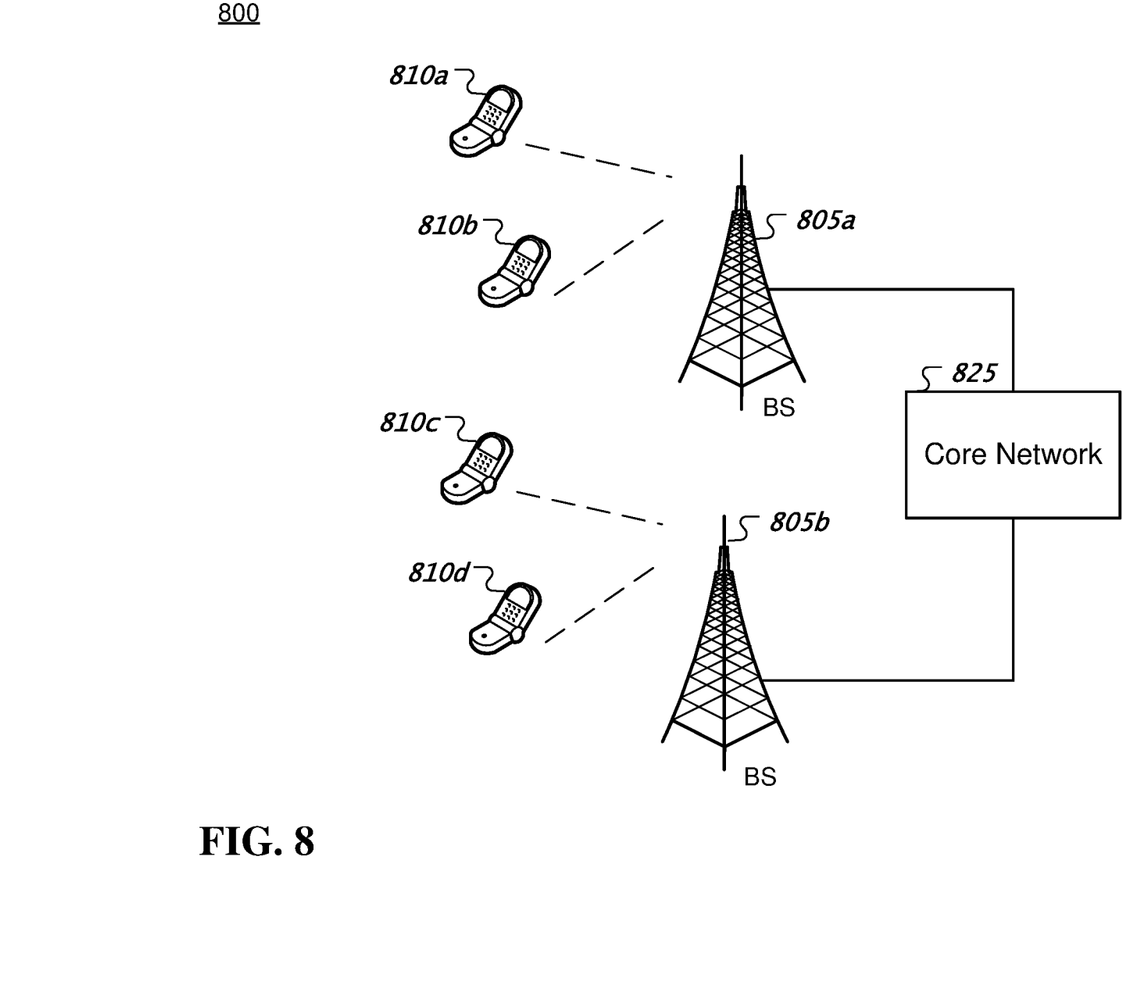
FIG. 8 shows an example of a wireless communication system where techniques in accordance with one or more embodiments of the present technology can be applied.

FIG. 8 shows an example of a wireless communication system 800 where techniques in accordance with one or more embodiments of the present technology can be applied. A wireless communication system 800 can include one or more base stations (BSs) 805a, 805b, one or more wireless devices 810a, 810b, 810c, 810d, and a core network 825. A base station 805a, 805b can provide wireless service to wireless devices 810a, 810b, 810c and 810d in one or more wireless sectors. In some implementations, a base station 805a, 805b includes directional antennas to produce two or more directional beams to provide wireless coverage in different sectors.

The core network 825 can communicate with one or more base stations 805a, 805b. The core network 825 provides connectivity with other wireless communication systems and wired communication systems. The core network may include one or more service subscription databases to store information related to the subscribed wireless devices 810a, 810b, 810c, and 810d. A first base station 805a can provide wireless service based on a first radio access technology, whereas a second base station 805b can provide wireless service based on a second radio access technology. The base stations 805a and 805b may be co-located or may be separately installed in the field according to the deployment scenario. The wireless devices 810a, 810b, 810c, and 810d can support multiple different radio access technologies.

Figure 9:
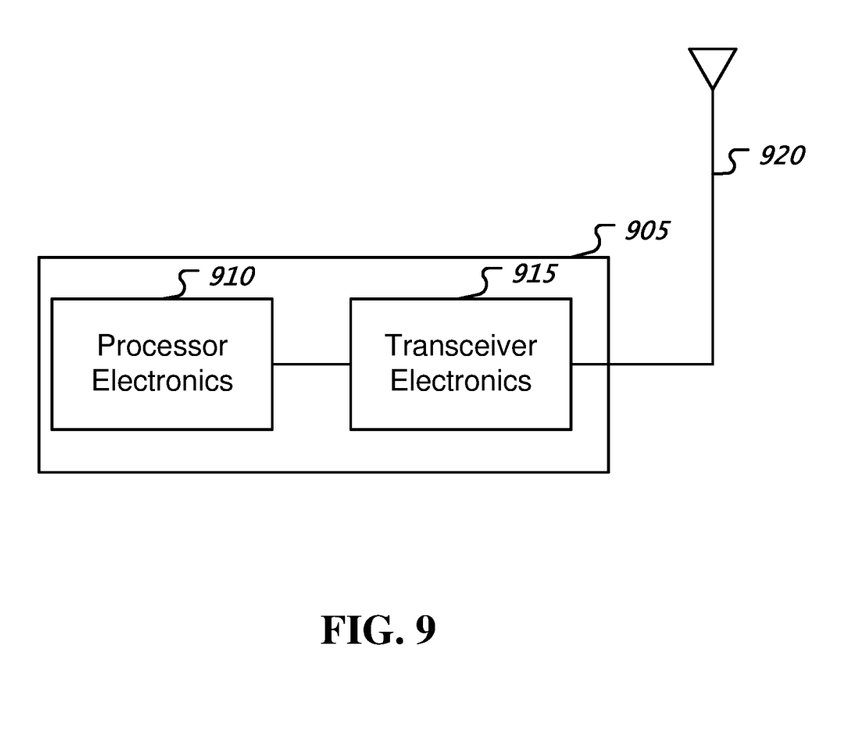
FIG. 9 is a block diagram representation of a portion of a radio station in accordance with one or more embodiments of the present technology can be applied.

FIG. 9 is a block diagram representation of a portion of a radio station. A radio station 905 such as a base station or a wireless device (or UE) can include processor electronics 910 such as a microprocessor that implements one or more of the wireless techniques presented in this document. The radio station 905 can include transceiver electronics 915 to send and/or receive wireless signals over one or more communication interfaces such as antenna 920. The radio station 905 can include other communication interfaces for transmitting and receiving data. Radio station 905 can include one or more memories (not explicitly shown) configured to store information such as data and/or instructions. In some implementations, the processor electronics 910 can include at least a portion of the transceiver electronics 915. In some embodiments, at least some of the disclosed techniques, modules or functions are implemented using the radio station 905.

It will be appreciated that the present document discloses techniques that can be embodied into wireless communication systems to increase spectrum utilization by transmitting data using the scattered narrow spectra without introducing interference among adjacent frequency sub-bands.

In one example aspect, a wireless communication method comprises determining a set of time-domain symbols by applying an inverse Fourier transform to a set of processed data modulated on multiple subcarrier groups. Each subcarrier group comprises an even number of subcarriers and adjacent subcarrier groups are separated by one or more unused subcarriers. The set of processed data is determined by applying a first spreading code to data carried in subcarrier groups having 2×m subcarriers based on a determination that m is a positive odd number and applying one or more spreading codes to data carried in subcarrier groups having 2×n subcarriers based on a determination that n is a positive even number. The method also includes transmitting the set of time-domain symbols.

In some embodiments, the individual subcarrier groups comprise different numbers of subcarriers. In some embodiments, the multiple subcarrier groups comprise a same number of subcarriers. In some embodiments, the number of the one or more unused subcarriers is greater than or equal to the number of subcarriers in any of the adjacent subcarrier groups.

In some embodiments, the first spreading code includes [1, −1]. In some embodiments, the one or more spreading codes include at least one of [1, −1], [1, −1, −1, 1], [1, −1, 1, −1], or [1, 1, −1, −1]. In some embodiments, applying the one or more spreading codes to the data carried in subcarrier groups having 2×n subcarriers comprises applying a spreading code of [1, −1] to uplink data carried in the subcarrier groups. In some embodiments, applying the one or more spreading codes to the data carried in subcarrier groups having 2×n subcarriers comprises applying at least one of spreading code [1, −1, −1, 1], [1, −1, 1, −1], or [1, 1, −1, −1] to downlink data carried in the subcarrier groups.

In some embodiments, the data modulated on the multiple subcarrier groups includes multiple layers, and the set of processed data is determined by applying different spreading codes to different layers of the data to obtain multiple sequences of spread data and multiplexing the multiple sequences of spread data to obtain the set of processed data.

In some embodiments, the set of processed data is determined by, for different subcarrier groups having 2×n subcarriers, applying different spreading codes to data carried the individual subcarrier groups.

In another example aspect, a wireless communication method comprises receiving a set of time-domain symbols carrying a set of processed data modulated on one or more subcarrier groups. Each subcarrier group comprises an even number of subcarriers. The set of processed data corresponds to an output of applying a first spreading code to data carried in subcarrier groups having 2×m subcarriers based on a determination that m is a positive odd number and applying one or more spreading codes to data carried in subcarrier groups having 2×n subcarriers based on a determination that n is a positive even number. The method also includes demodulating the set of time-domain symbols to obtain the data.

In some embodiments, the individual subcarrier groups comprise different numbers of subcarriers. In some embodiments, the multiple subcarrier groups comprise a same number of subcarriers. In some embodiments, the number of the one or more unused subcarriers is greater than or equal to the number of subcarriers in any of the adjacent subcarrier groups.

In some embodiments, the first spreading code includes [1, −1]. In some embodiments, the one or more spreading codes include at least one of [1, −1], [1, −1, −1, 1], [1, −1, 1, −1], or [1, 1, −1, −1]. In some embodiments, applying the one or more spreading codes to the data carried in subcarrier groups having 2×n subcarriers comprises applying a spreading code of [1, −1] to uplink data carried in the subcarrier groups. In some embodiments, applying the one or more spreading codes to the data carried in subcarrier groups having 2×n subcarriers comprises applying at least one of spreading code [1, −1, −1, 1], [1, −1, 1, −1], or [1, 1, −1, −1] to downlink data carried in the subcarrier groups.

In some embodiments, the data modulated on the multiple subcarrier groups includes multiple layers. The set of processed data corresponds to an output of applying different spreading codes to different layers of the data to obtain multiple sequences of spread data and multiplexing the multiple sequences of spread data to obtain the set of processed data.

In some embodiments, the set of processed data corresponds to an output of, for different subcarrier groups having 2×n subcarriers, applying different spreading codes to data carried the individual subcarrier groups.

In another example aspect, a communication apparatus is disclosed. The apparatus comprises a processor configured to implement the methods disclosed above.

In yet another example aspect, a computer program product having code stored thereon is disclosed. The code, when executed by a processor, causes the processor to implement the methods disclosed above.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A wireless communication method, comprising:
determining a set of time-domain symbols by applying an inverse Fourier transform to a set of processed data modulated on multiple subcarrier groups,
wherein each subcarrier group comprises an even number of subcarriers and adjacent subcarrier groups are separated by unused subcarriers,
wherein a number of the unused subcarriers is greater than or equal to a number of subcarriers in any of the adjacent subcarrier groups, and
wherein the set of processed data is determined by:
applying a first spreading code [1, −1] to data carried in subcarrier groups having 2×m subcarriers based on a determination that m is a positive odd number, and
applying one or more spreading codes of length 2 or of length 4 to data carried in subcarrier groups having 2×n subcarriers based on a determination that n is a positive even number; and
transmitting the set of time-domain symbols.

2. The method of claim 1, wherein the applying the one or more spreading codes to the data carried in subcarrier groups having 2×n subcarriers comprises applying a spreading code of [1, −1] to uplink data carried in the subcarrier groups having 2×n subcarriers.

3. The method of claim 1, wherein the applying the one or more spreading codes to the data carried in subcarrier groups having 2×n subcarriers comprises applying at least one of spreading code [1, −1, −1, 1], [1, −1, 1, −1], or [1, 1, −1, −1] to downlink data carried in the subcarrier groups having 2×n subcarriers.

4. The method of claim 1, wherein the set of processed data modulated on the multiple subcarrier groups includes multiple layers, and wherein the set of processed data is determined by:
applying different spreading codes to different layers of the data to obtain multiple sequences of spread data; and
multiplexing the multiple sequences of spread data to obtain the set of processed data.

5. The method of claim 1, wherein the set of processed data is determined by:
for different subcarrier groups having 2×n subcarriers, applying different spreading codes to data carried in the individual subcarrier groups.

6. A wireless communication method, comprising:
receiving a set of time-domain symbols carrying a set of processed data modulated on multiple subcarrier groups,
wherein each subcarrier group comprises an even number of subcarriers and adjacent subcarrier groups are separated by unused subcarriers,
wherein a number of the unused subcarriers is greater than or equal to a number of subcarriers in any of the adjacent subcarrier groups, and
wherein the set of processed data corresponds to an output of:
a first spreading code [1, −1] applied to data carried in subcarrier groups having 2×m subcarriers based on m being a positive odd number, and
one or more spreading codes of length 2 or of length 4 applied to data carried in subcarrier groups having 2×n subcarriers based on n being a positive even number; and
demodulating the set of time-domain symbols to obtain time domain data.

7. The method of claim 6, wherein the applying the one or more spreading codes to the data carried in subcarrier groups having 2×n subcarriers comprises applying a spreading code of [1, −1] to uplink data carried in the subcarrier groups having 2×n subcarriers.

8. The method of claim 6, wherein the applying the one or more spreading codes to the data carried in subcarrier groups having 2×n subcarriers comprises applying at least one of spreading code [1, −1, −1, 1], [1, −1, 1, −1], or [1, 1, −1, −1] to downlink data carried in the subcarrier groups having 2×n subcarriers.

9. The method of claim 6, wherein the set of processed data modulated on the multiple subcarrier groups includes multiple layers, and wherein the set of processed data corresponds to an output of:
applying different spreading codes to different layers of the data to obtain multiple sequences of spread data; and
multiplexing the multiple sequences of spread data to obtain the set of processed data.

10. The method of claim 6, wherein the set of processed data corresponds to an output of:
for different subcarrier groups having 2×n subcarriers, applying different spreading codes to data carried in the individual subcarrier groups.

11. A communication apparatus, comprising a processor configured to implement a method, comprising:
determine a set of time-domain symbols by an application of an inverse Fourier transform to a set of processed data modulated on multiple subcarrier groups,
wherein each subcarrier group comprises an even number of subcarriers and adjacent subcarrier groups are separated by unused subcarriers,
wherein a number of the unused subcarriers is greater than or equal to a number of subcarriers in any of the adjacent subcarrier groups, and wherein the set of processed data is determined by the processor configured to:
apply a first spreading code [1, −1] to data carried in subcarrier groups having 2×m subcarriers based on a determination that m is a positive odd number, and
apply one or more spreading codes of length 2 or of length 4 to data carried in subcarrier groups having 2×n subcarriers based on a determination that n is a positive even number; and
transmit the set of time-domain symbols.

12. The communication apparatus of claim 11, wherein the one or more spreading codes are applied to the data carried in subcarrier groups having 2×n subcarriers by the processor configured to apply a spreading code of [1, −1] to uplink data carried in the subcarrier groups having 2×n subcarriers.

13. The communication apparatus of claim 11, wherein the one or more spreading codes are applied to the data carried in subcarrier groups having 2×n subcarriers by the processor configured to apply at least one of spreading code [1, −1, −1, 1], [1, −1, 1, −1], or [1, 1, −1, −1] to downlink data carried in the subcarrier groups having 2×n subcarriers.

14. A communication apparatus, comprising a processor configured to implement a method, comprising:
receive a set of time-domain symbols carrying a set of processed data modulated on multiple subcarrier groups,
wherein each subcarrier group comprises an even number of subcarriers and adjacent subcarrier groups are separated by unused subcarriers,
wherein a number of the unused subcarriers is greater than or equal to a number of subcarriers in any of the adjacent subcarrier groups, and
wherein the set of processed data corresponds to an output of:
a first spreading code [1, −1] applied to data carried in subcarrier groups having 2×m subcarriers based on m being a positive odd number, and
one or more spreading codes of length 2 or of length 4 applied to data carried in subcarrier groups having 2×n subcarriers based on n being a positive even number; and
demodulate the set of time-domain symbols to obtain time domain data.

15. The communication apparatus of claim 14, wherein the one or more spreading codes are applied to the data carried in subcarrier groups having 2×n subcarriers by the processor configured to apply a spreading code of [1, −1] to uplink data carried in the subcarrier groups having 2×n subcarriers.

16. The communication apparatus of claim 14, wherein the one or more spreading codes are applied to the data carried in subcarrier groups having 2×n subcarriers by the processor configured to apply at least one of spreading code [1, −1, −1, 1], [1, −1, 1, −1], or [1, 1, −1, −1] to downlink data carried in the subcarrier groups having 2×n subcarriers.

* * * * *